United States Patent [19]

Mehron

[11] 4,358,766
[45] Nov. 9, 1982

[54] JAMMING SIGNAL REDUCTION SYSTEM

[75] Inventor: Martin E. Mehron, Nashua, N.H.

[73] Assignee: Sanders Associates, Inc., Nashua, N.H.

[21] Appl. No.: 484,478

[22] Filed: Jul. 1, 1974

[51] Int. Cl.³ .............................................. G01S 7/36
[52] U.S. Cl. .................................................. 343/18 E
[58] Field of Search ..................................... 343/18 E

[56] References Cited

U.S. PATENT DOCUMENTS

| | | | |
|---|---|---|---|
| 3,648,287 | 3/1972 | Lind | 343/18 E |
| 3,670,333 | 6/1972 | Winn | 343/18 E |
| 3,821,752 | 6/1974 | McKelvey | 343/18 E X |
| 3,870,995 | 3/1975 | Nielson | 343/18 E |

*Primary Examiner*—Malcolm F. Hubler
*Attorney, Agent, or Firm*—Louis Etlinger; Richard I. Seligman

[57] ABSTRACT

Improved radar system performance in a jamming environment is achieved by making a complete frequency analysis of the jamming power entering the radar receiver during each range sweep (once per transmitted pulse) and then setting the frequency of the next transmitted pulse to the value which corresponds to the minimum jamming power measured.

8 Claims, 3 Drawing Figures

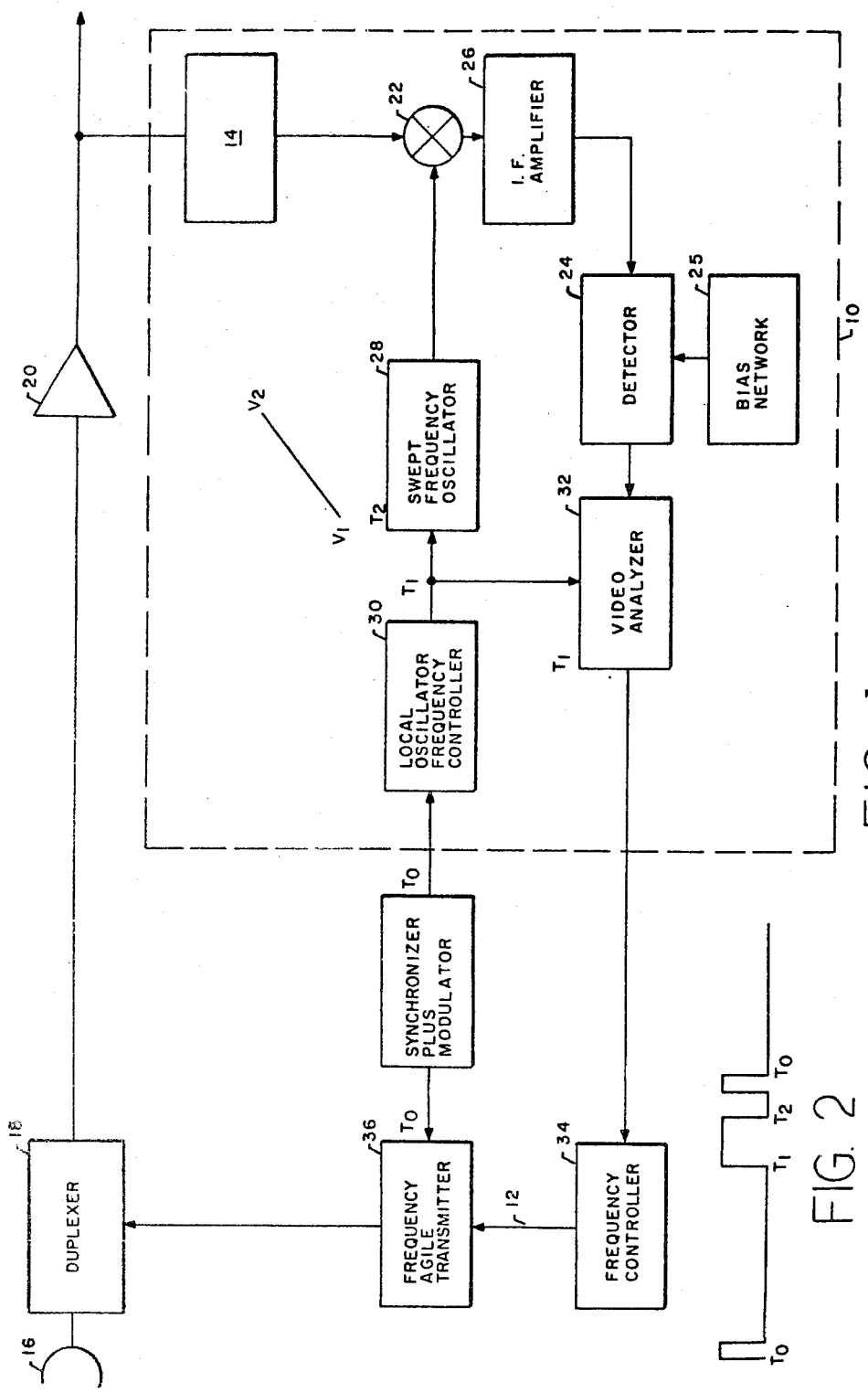

JAMMING SIGNAL REDUCTION SYSTEM

BACKGROUND OF THE INVENTION

An important consideration in the design of radar systems, particularly those for military applications, is the provision of means for minimizing the effects of hostile stand-off (mutual support) jamming either main lobe or side lobe.

Many techniques have been used to minimize the effects of such hostile jamming including side-lobe cancelling techniques. The side-lobe cancellers reduce interference in antenna side lobes while not improving any interference in the main lobe. The side-lobe cancellers are also relatively costly since extensive modification must be made to a radar installation including the addition of another antenna and receiver. Furthermore, the side-lobe cancellers require a separate loop for each jammer.

It has also been found that the large fluctuation in jamming power versus frequency occur very rapidly and the effects of these variations will be different when measured from two different antennas. The prior art apparatus, thus, cannot take advantge of the fast fluctuations and also measures jamming with an antenna that is not seeing the true jamming entering the radar.

SUMMARY OF THE INVENTION

Accordingly, it is an object of this invention to provide improved means for reducing the effects of jamming on radar.

It is a further object of this invention to provide means for reducing the effects of hostile jamming on frequency agile radar.

It is another object of this invention to provide means for reducing the effects of jamming on radar wherein the actual radar receiver circuit and antenna are used to determine the jamming power.

It is yet another object of this invention to provide means for minimizing jamming interference on radar in the presence of multiple jammers.

It is a still further object of this invention to provide means for reducing both main lobe and side lobe jamming interference.

An anti-jamming radar having high jamming reduction even in the main beam is provided inexpensively. No antenna modification is required. The technique operated equally effectively against any form of cw jamming, either fm, am or any combination thereof.

This technique is intended to allow a frequency agile radar to be tuned automatically to a frequency which will minimize the effects of hostile standoff (mutual support) jamming either main lobe or side lobe.

A coupler is introduced in the wide band R.F. portion of the radar receiver system to feed a spectrum analyzer which covers the complete R.F. tuning range of the radar transmitter. Following each radar pulse, the frequency analyzer is gated on for a number of microseconds during dead time, just before the next transmitter pulse. During this dead time there will normally be little or no target returns so that without jamming the radar's receiver noise only would be present. If the radar is being jammed by a CW jammer with sufficient power to interfere with radar performance then the signal level during dead time will increase above the normal receiver noise level. A frequency analysis of the jamming signals is made and the frequency at which the jamming amplitude is a minimum is determined. This optimum frequency is then sent to the transmitter as a coded word or analog voltage to be used in determining the frequency of the next transmitted pulse. Since this optimum frequency will not change significantly in any one pulse interval, the transmitter is essentially always operating at the correct frequency to minimize jamming interference.

BRIEF DESCRIPTION OF THE DRAWINGS

The above-mentioned and other features and objects of this invention will become more apparent by reference to the following description taken in conjunction with the accompanying drawings, in which:

FIG. 1 is a basic block diagram of the invention;

FIG. 2 is a timing diagram illustrating operation of the system of FIG. 1; and

DESCRIPTION OF PREFERRED EMBODIMENTS

Figure 3:
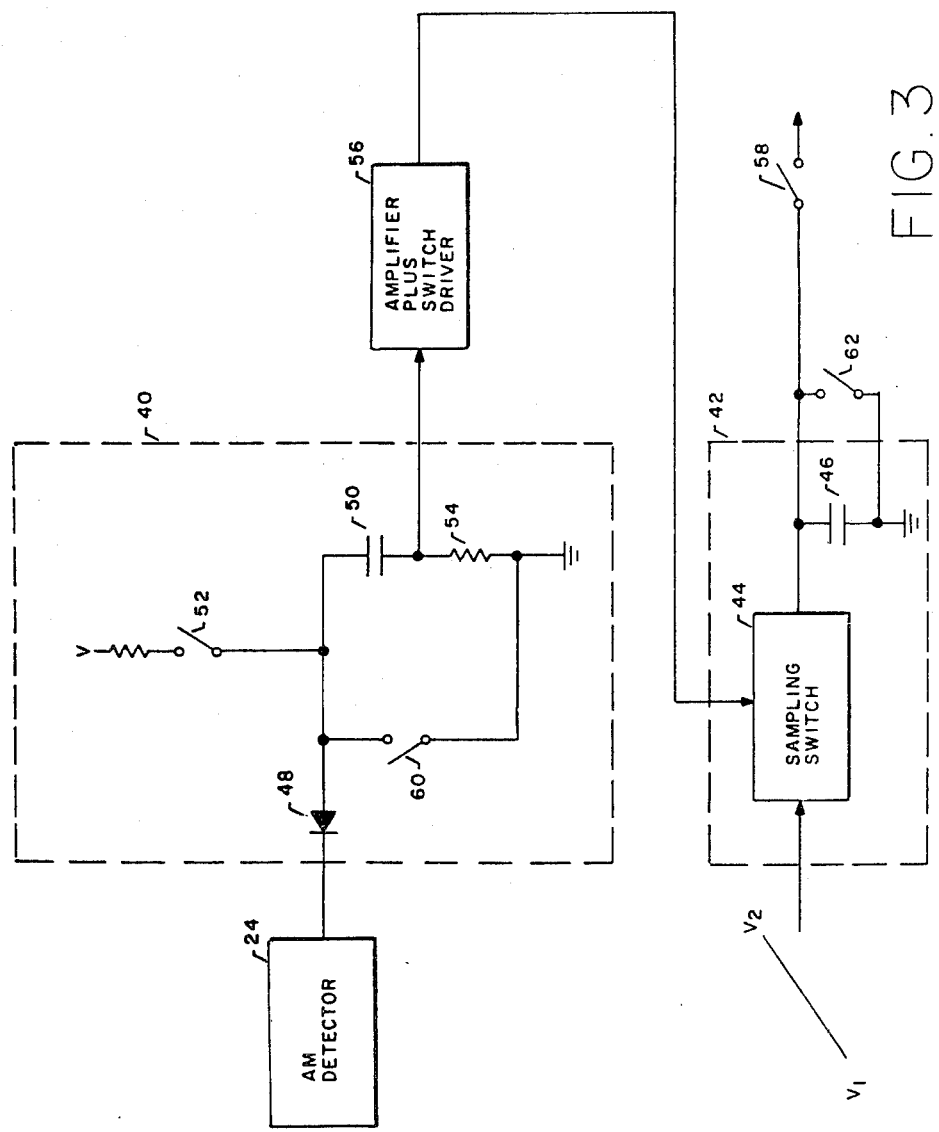
FIG. 3 is a schematic diagram of a video analyzer employed in the embodiment of FIG. 1.

Referring to FIG. 1, the circuitry shown within dotted lines 10 is added to a conventional frequency agile radar 12 to provide the jamming reduction instrumentation. A coupler 14 samples a portion of the signals received in the wide band portion of the radar receiver via an antenna 16, a duplexer 18 and a low noise wide band amplifier 20, and applies this signal to a mixer 22. The output from mixer 22 is applied to a detector 24 via an I.F. amplifier 26. Mixer 22 has a second input thereto from a swept frequency local oscillator 28. Mixer 22, swept frequency local oscillator 28, amplifier 26 and detector 24 comprise the basic elements of a conventional spectrum analyzer.

In this system swept frequency local oscillator 28 is controlled by a swept frequency local oscillator controller 30 which receives a timing pulse corresponding to the transmitter pulse time ($T_o$) from a radar synchronizer-modulator 32. The controller then introduces a fixed delay, $T_1$, corresponding to the time the spectrum analyzer is to be gated on during the dead time of the radar receiver. At $T_1$ the controller 30 generates a linear voltage ramp which begins at $V_1$ volts and rises to $V_2$ volts at time $T_2$ which corresponds to the end of the spectrum analyzer time gate. This voltage ramp is fed to the swept frequency local oscillator 28 which is, for example, a conventional varactor tuned oscillator or YIG oscillator. This voltage ramp causes the oscillator 25 to change frequency linearly. This sweeping oscillator 28 in combination with the fixed frequency I.F. amplifier 26 and detector 24 results in sequentially measuring the power level versus frequency in the complete wide band portion of the radar receiver channel during dead time as shown in the timing diagram of FIG. 2. The detector is "back biased" via biasing network 25 so that only signals larger than normal receiver noise (e.g., jamming) will be detected.

A video analyzer 32 coupled to detector 24 measures the video signals coming from the detector over the time interval from $T_1$ to $T_2$. The video signal at $T_1$ corresponds to the jamming power at the low end of the radar's frequency band while the video signal at time $T_2$ corresponds to the jamming power at the high end of the radar's frequency band and the signals in between correspond to jamming power at the in between frequencies. Video analyzer 32 sequentially measures these video signal levels and determines the time, $T_{MIN}$, at which the video signals are of minimum amplitude. This is accomplished by comparing each new signal sample with a stored amplitude of the previous sample. If the new sample is smaller it is stored and the previous sample is discarded. If the new sample is larger then it is discarded and the previous sample is retained. This process continues across the total time interval $T_1$ to $T_2$ so that at the end of this time interval the time, $T_{MIN}$, corresponding to minimum received jammer power which uniquely defines the optimum frequency where jamming power is minimum will be stored. The value for $T_{MIN}$, (Optimum frequency) is then sent to a frequency controller 34 of the radar equipment and is used to set the frequency at $f_{opt}$ for the next transmission of a frequency agile transmitter 36.

One embodiment of a typical video analyzer 32 is shown in FIG. 3. The video analyzer comprises two principle components, a peak detector 40 and a sample and hold circuit 42. The ramp voltage $V_1$ to $V_2$ from local oscillator frequency controller 30 is applied to the sample and hold circuit 42 which in the illustrated embodiment includes a sampling switch 44 in series with a storage capacitor 46. The voltage appearing on the storage capacitor 46 will always be the last value of the ramp voltage $V_1$ to $V_2$ which existed when the sampling switch was closed.

The operation of sampling switch 44 is controlled by peak detector 40 which comprises a diode 48 or other rectifying element in series with a large capacitor 50. In actual operation, the video output of the AM detector 24 is applied to peak detector 40 which is connected in a manner such that it will only conduct when the applied voltage from AM detector 24 is lower in value than any previous voltage applied during the interval $T_1$ to $T_2$.

The video from AM detector 24, which is a positive voltage, is fed to the cathode of diode 48. At time $T_1$, the beginning of the ramp voltage, a switch 52 is closed momentarily to cause the capacitor 50 connected to the anode of diode 48, to charge up to the positive power supply voltage which is selected to be larger than the maximum voltage output of AM detector 24. As the voltage from AM detector 24 is applied to the cathode of the diode 48, the diode will conduct since the cathode will be negative with respect to the anode. This will cause the voltage of capacitor 50 to drop to the instantaneous value of the AM detector voltage. During the complete time interval $T_1$ to $T_2$ the AM detector voltage will vary in amplitude in accordance with the jamming power. The diode will only conduct whenever the AM detector voltage is lower in value than any previous voltage since the output capacitor will always be charged up to the lowest voltage applied thereto. Thus, the last time that the diode 48 conducts during the period $T_1$ to $T_2$ is at the lowest AM detector voltage which corresponds to the lowest jamming power.

A small resistor 54 is provided to produce a voltage whenever diode 48 conducts. This voltage is coupled to sampling switch 44 via an amplifier and switch driver 56 and causes sampling switch 44 to close whenever the diode conducts. Thus, the last time that sampling switch 44 is closed will correspond to the time at which the minimum jamming power was received.

The output voltage of the sample and hold circuit 42 at the end of the period $T_2$, will thus correspond to the value of the ramp voltage, $V_1$ to $V_2$, which occurred at the time of minimum jamming power.

Since the value of the ramp voltage and frequency are uniquely related, the voltage output of the sample and hold circuit 42 at time $T_2$ will also uniquely indicate the frequency of minimum jamming power.

An output switch 58 momentarily samples the voltage on storage capacitor 46 at time $T_2$ and applies this voltage to the radar transmitter frequency controller 34 to cause the next transmitted pulse to occur at the frequency of minimum jamming. This would occur as described if the radar transmitter frequency controller accepted analogue voltage inputs. If digital inputs are required, then the sampled voltage from capacitor 46 would be converted to a compatible digital word by means of a conventional analogue to digital converter (not shown).

At the end of the period $T_2$ both capacitors 50 and 46 are discharged by momentarily closing a pair of switches 60 and 62 so that the complete operation can be repeated during the next pulse interval $T_1$ to $T_2$.

Both the peak detector and sample and hold circuits are well known and are described herein for clarification only.

Although mechanical switches are shown for clarity, electronic switches could be used with the entire switching operation controlled through a simple logic timing circuit.

While the exact system parameters will be determined by the particular radar, an example of a typical radar will bring out the principles involved. Assume that the radar has an instantaneous bandwidth of 4 MHz and is frequency agile over the 3.1–3.5 GHz band. Thus, there are 100 possible frequency "slots". Assume also that we are dealing with a conventional 200 n mile search radar with a typical pulse repetition interval of 3 milliseconds.

In this case the target echos to be displayed for the 200 n. miles range would occupy 2.5 milliseconds after each transmitted pulse. Thus, $T_1$ is set at 2.6 milliseconds and $T_2$ at 2.7 milliseconds for a time gate of $100\mu$ seconds. The bandwidth of I.F. amplifier 26 is set at 4 MHz corresponding to the instantaneous bandwidth of the radar. The center frequency of the I.F. amplifier 26 is set at 300 MHz and swept frequency local oscillator 28 sweeps linearly from 3.4 GHz at $T_1$ to 3.8 GHz at $T_2$. This avoids any image problems. The sweep rate is thus 400 MHz in $100\mu$ seconds or 4 MHz/$\mu$ sec. Since I.F. amplifier 26 has a bandwidth of 4 MHz its "rise time" is about $0.25\mu$ sec., the amplifier will be capable of reaching full amplitude as the spectrum is scanned. Actually "gate time" can be reduced down to only $25\mu$ sec. in this case, if desired.

As mentioned previously, the system of FIG. 1 provides jamming signal reduction in the main lobe as well as side lobes.

Consider first that the radar antenna is stopped so that a hostile noise jammer is located in a side lobe. Since the radar has frequency agility, it is assumed that the jammer will be operating in a barrage mode that covers the tuning range of the radar. If the jamming power versus frequency in the wide band portion of the receiver channel is measured, very large fluctuations over the total bandwidth will be found. These variations are produced by three major mechanisms. First, the jamming source will have distinct variations, both fine grain and coarse grain, due to the jamming transmitter, antenna system and mismatches, etc. The second mechanism causing large variations is due to the propagation path, particularly the effects of multipath interference.

Under practical operational situations it is readily possible for the jamming signal to vary between +5 dB to −20 dB of the free space value depending on frequency and geometry. The third mechanism which causes large variations is due to the frequency response of the radar antenna in the side lobe region. Assume that complete 360° azimuth antenna patterns are made at a large number of different frequencies covering the total operating band of the radar. It will be found that the main lobes of the various patterns will be very similar in shape, except for the slight variations in beam width due to the frequency changes. However, in the region beyond the close-in side lobes the antenna patterns will have very large variations at any one azimuth angle as the frequency is changed. These variations can be greater than 20 dB.

The jamming power spectrum measured at any one instant would be due to the superposition of the three individual spectrums produced by the above three mechanisms. The frequency that has the minimum total jamming power at any instant of time is defined as the optimum frequency, $f_{opt}$.

When the antenna rotates in a normal manner $f_{opt}$ will change at a rate largely based on the rate of change of the side lobe structure of the antenna pattern since both the jammer spectrum and propagation spectrum are relatively stable. Typical search radar antennas have side lobe fluctuations of the order of 15–30 milliseconds from peak to null. If it is assumed that the radar has a PRI of the order of 3 milliseconds and measure $f_{opt}$ on each pulse then the "sampling rate" will be adequate to track the variations in $f_{opt}$ with small errors as the antenna rotates.

This whole process described above can be thought of as creating a null in the antenna's side lobe pattern aimed at the jamming source. If several jammers are present at various azimuth angles the system will automatically examine the sum total of the jamming energy being received and select a transmitter frequency corresponding to the minimum amount of jamming energy.

The previous discussion was related to the suppression of jamming signals arriving through the radar antennas side lobes. Consider now a stand-off jammer located in the antennas main lobe. This might be an aircraft which has fired an anti-shipping missile. In this case, the major sources of variation with frequency will be due to jammer source fluctuations and propagation fluctuations. The same instrumentation will again examine the jamming energy spectrum and select a transmitter frequency which minimizes the jamming. The improvement that can be expected here will not be as large as in the side lobe case since advantage cannot be taken of the large fluctuations that exist in the side lobes but not in the main lobe. However, it is expected that by selecting the optimum frequency the jamming will be reduced a minimum of 15 dB in most cases.

Note that in main beam jamming it is assumed that a stand-off aircraft is trying to hide an attacking missile which could also be in the main beam. Since the jammer and target (missile) are not co-located the minimizing of jammer energy by placing the aircraft in a multi-path null will not (normally) result in placing the target in a null. In general, main beam operation will not be effective against a co-located jammer/target as in self screening because of the tendency to reduce both jamming and signal due to multi-path.

While I have described above the principles of my invention in accordance with specific apparatus it is to be clearly understood that the description is made only by way of example, and not as a limitation of the scope of my invention as set forth in the accompanying claims.

I claim:

1. In a frequency agile radar, apparatus for transmitting a frequency which corresponds to a low jamming frequency, comprising:
    means for sampling a portion of the input to the radar during the dead time of the radar receiver;
    means for measuring said sampled portion of the input to determine the frequency of the minimum received total jamming power; and
    means for controlling the frequency of the signal to be transmitted by the radar on the next pulse to correspond to the frequency of the minimum received total jamming power.

2. Apparatus as defined in claim 1, wherein said measuring means includes:
    means for measuring the power level versus frequency of the sampled input; and
    means for analyzing the measured power level versus frequency to determine the frequency of the minimum received total jamming power.

3. Apparatus as defined in claim 2, wherein said means for measuring the power level versus frequency of the sampled input includes:
    means for generating a swept frequency;
    means for mixing the output of said swept frequency generating means with the sampled input to generate an IF signal; and
    an AM detector coupled to said mixing means.

4. Apparatus as defined in claim 3, further including an I.F. amplifier coupling said mixing means and said AM detector.

5. Apparatus as defined in claim 2 wherein said analyzing means includes:
    a peak detector coupled to said power level versus frequency measuring means for storing the lowest value of power of the sampled input; and
    a sample and hold circuit coupled to said peak detector for enabling thereof for storing a voltage corresponding to the frequency of the lowest value of power of the sampled input.

6. Apparatus as defined in claim 5, further including means for applying the stored voltage in said sample and hold circuit to said frequency controlling means.

7. Apparatus as defined in claim 4, wherein said means for generating a swept frequency includes;
    means for generating a voltage ramp; and
    a voltage controlled oscillator coupled to said means for generating a voltage ramp.

8. Apparatus as defined in claim 7, wherein said analyzing means includes:
    a peak detector coupled to said AM detector; and
    a sample and hold circuit enabled by said peak detector and having as an input thereto an output from said means for generating a ramp voltage whereby said sample and hold circuit stores a voltage proportional to the frequency at which jamming power is a minimum.

* * * * *